(12) United States Patent
Park

(10) Patent No.: US 6,808,261 B1
(45) Date of Patent: Oct. 26, 2004

(54) RIMLESS EYEWEAR SYSTEM AND METHOD

(75) Inventor: Young Ho Park, Daegu (KR)

(73) Assignee: Altair Eyewear, Rancho Cordova, CA (US)

( * ) Notice: Subject to any disclaimer, the term of this patent is extended or adjusted under 35 U.S.C. 154(b) by 86 days.

(21) Appl. No.: 10/435,363

(22) Filed: May 8, 2003

(51) Int. Cl.[7] .................................................. G02C 1/02
(52) U.S. Cl. ....................................... 351/110; 351/124
(58) Field of Search ........................... 351/110, 41, 111, 351/124

(56) References Cited

U.S. PATENT DOCUMENTS 6,250,755 B1 * 6/2001 Conner et al. ............... 351/110

* cited by examiner

Primary Examiner—Hung Xuan Dang
(74) Attorney, Agent, or Firm—Brian L. Johnson; Davis Wright Tremaine LLP

(57) ABSTRACT

A rimless frame system and method is provided to address among other things durability control issues of conventional rimless eyewear designs involved with connection of temples and bridges with lenses of the rimless eyewear. The rimless frame system includes tapered caps that are threaded onto pins located on the temples and on the bridge. As the tapered caps are tightened onto the pins they radially expand sleeves that in turn apply radial forces to inner surfaces of holes properly positioned in the eyewear lenses. These radial forces between the sleeves and the inner surfaces of the lenses holes affix the temples and the bridge to the lenses of the rimless eyewear.

18 Claims, 14 Drawing Sheets

RIMLESS EYEWEAR SYSTEM AND METHOD

BACKGROUND OF THE INVENTION

1. Field of the Invention

This invention relates generally to eyewear, and more particularly, to systems and methods for rimless eyewear.

2. Description of the Related Art

In general, eyewear includes two lenses, a bridge to support the eyewear from a user's nose and two temples to further position the eyewear by contacting either side of the user's head. Most temple designs are supported by the user's ears. Much eyewear includes a frame for each of the two lenses and incorporates the bridge and temples into a general frame design. In this general frame design each of the temples is hinged from one of the lens frames and the bridge connects the two lens frames together.

Some eyewear does away with the two lens frames and instead attaches the temples and bridge directly to the lenses to form a rimless frame design. These rimless designs are desirable, but unfortunately experience quality control and durability problems due in part to the requirement of affixing the temple and bridge hardware directly to the lenses.

BRIEF SUMMARY OF THE INVENTION

The present invention resides in a rimless frame system and method. Embodiments include a first lens and a second lens, each lens having a hole with a hole diameter and an inner surface, each lens having a circumferential surface; and a first temple connected to the first lens and a second temple connected to the second lens. Each temple includes a positioning member, a connection member, and a hinge. The positioning member is coupled to the connection member by the hinge. The connection member of each temple includes a threaded pin with a pin diameter and threads. The threaded pin extending into the lens hole of the one of the first and second lenses to which the temple is connected.

The connection member further includes an expandable sleeve being a longitudinal hollow cylinder having an inner sleeve diameter, an outer sleeve diameter, an outer sleeve surface and first and second ends. The first end has an opening with an inner diameter greater than the pin diameter. The second end has an opening with a second inner diameter. The threaded pin extends through the first end opening and within the expandable sleeve.

The connection member further includes a tapered cap having an interior and a first end portion with an opening providing access to the interior. The interior has a threaded inner surface. The threaded pin extends into the interior of the tapered cap through the opening of the tapered cap. The tapered cap is threaded onto the threaded pin. The first end portion has a first exterior surface portion with a first outer diameter smaller than the second inner diameter of the expandable sleeve. The tapered cap has a second portion having a second exterior surface portion with a second outer diameter greater than the first outer diameter. The tapered cap extends at least partially within the expandable sleeve.

The tapered cap has an exterior surface extending between the first and second exterior surface portions with an outer diameter increasing from the first outer diameter of the first end portion to the second outer diameter of the second portion to increasingly frictionally engage the tapered cap with the expandable sleeve and radially outward expand the outer sleeve diameter of the expandable sleeve as the tapered cap is being threaded onto the threaded pin. The second outer diameter of the tapered cap is sized to radially expand the expandable sleeve to increase the outer sleeve diameter sufficiently to frictionally engage the outer sleeve surface with the inner surface of the lens hole within which positioned to securely connect the connection member with the one of the first and second lenses to which the temple is connected.

Other features and advantages of the invention will become apparent from the following detailed description, taken in conjunction with the accompanying drawings.

DETAILED DESCRIPTION OF THE INVENTION

A rimless frame system and method is provided to address among other things durability and quality control issues of conventional rimless eyewear designs involved with connection of temples and bridges with lenses of the rimless eyewear. Implementations of the rimless frame system include tapered caps that are threaded onto pins located on the temples and on the bridge. As the tapered caps are tightened onto the pins they radially expand sleeves or tubes that in turn apply radial forces to inner surfaces of holes properly positioned in the eyewear lenses. These radial forces between the sleeves and the inner surfaces of the lenses holes affix the temples and the bridge to the lenses of the rimless eyewear. The materials used for the rimless frame system include conventional materials such as metals, plastics, and composites.

Figure 1:
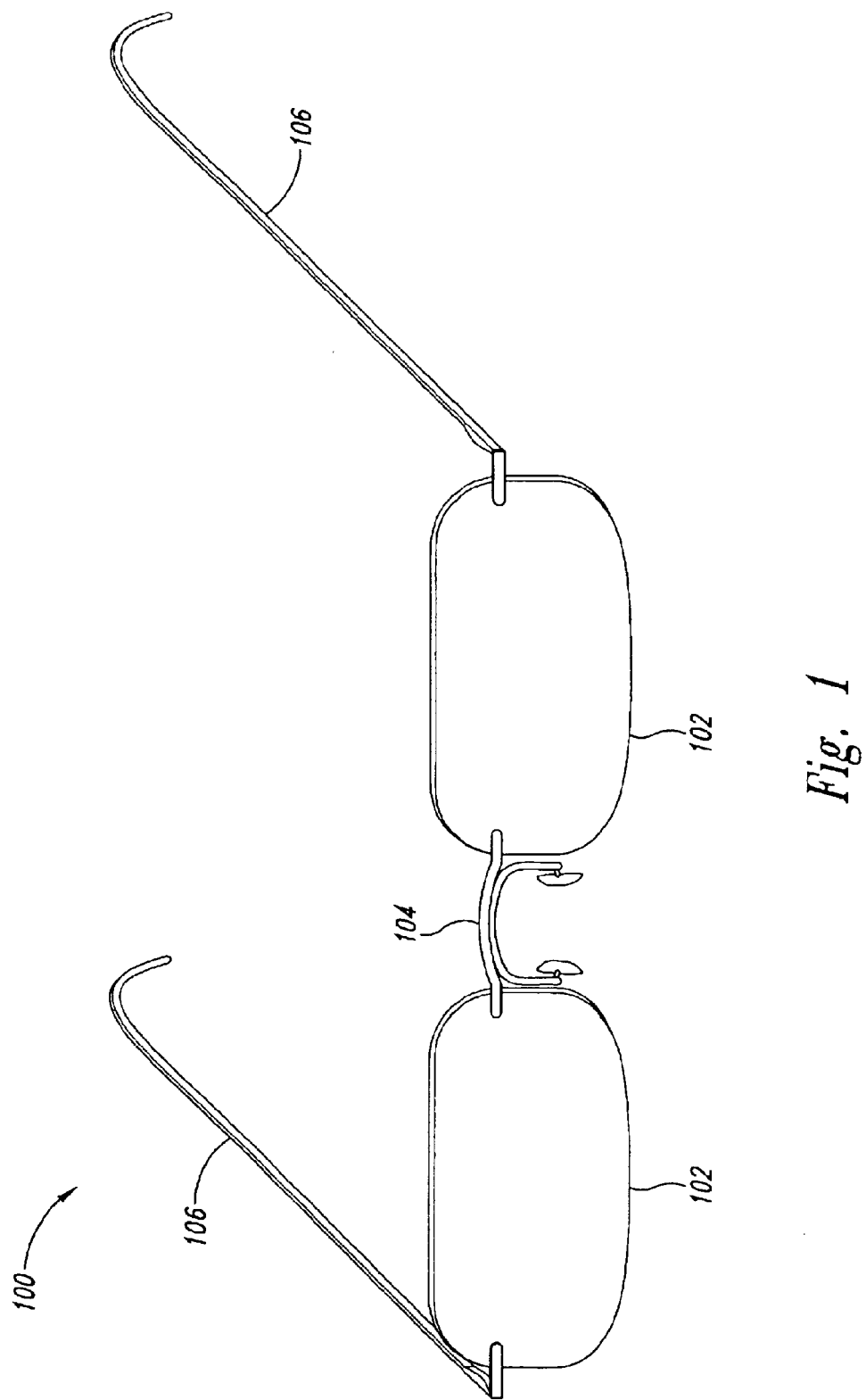
FIG. 1 is an isometric view of an exemplary implementation of a rimless frame system embodying the present invention.
Figure 2:
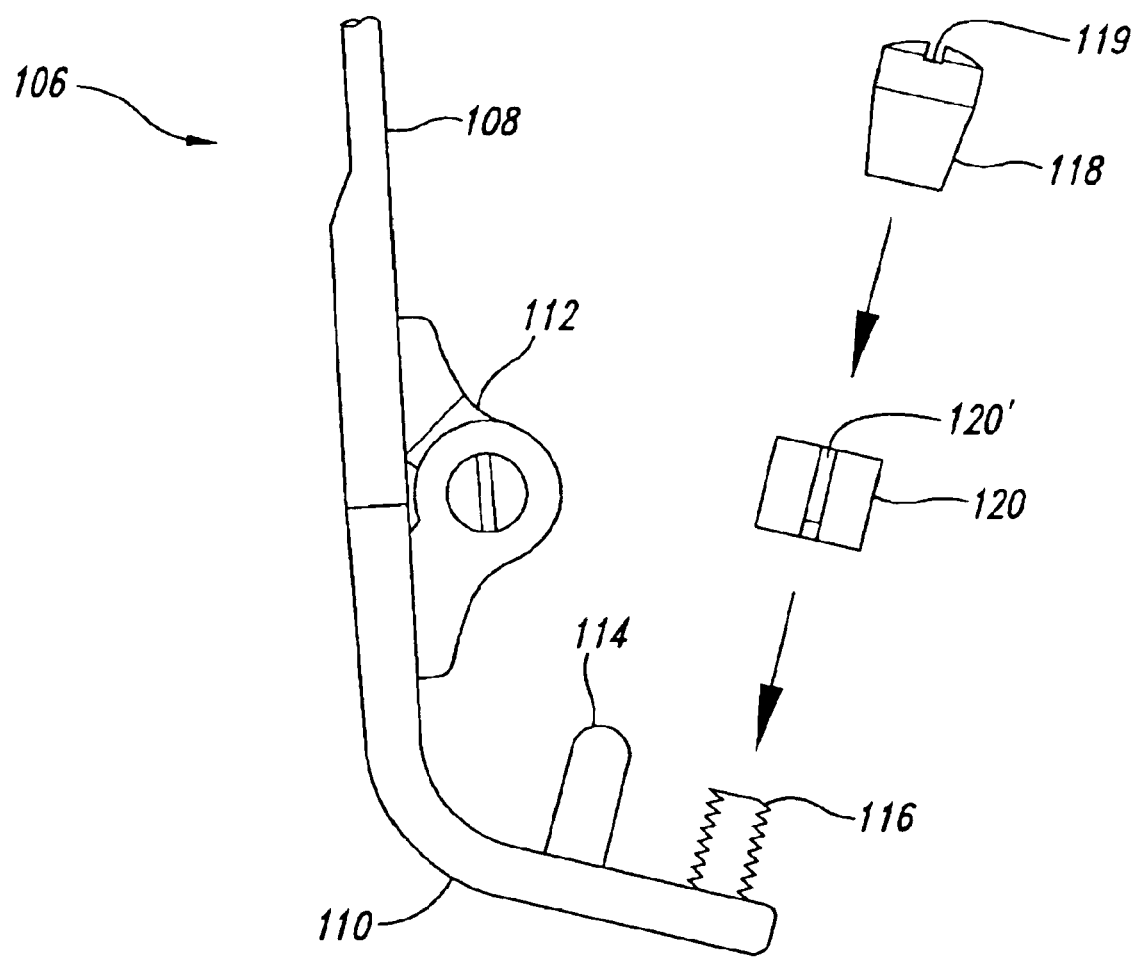
FIG. 2 is an exploded, enlarged top plan view of a portion of one of the temples of the implementation shown in FIG. 1.

An implementation of the rimless frame system is shown in FIG. 1 as applied to a rimless eyewear 100 including two lenses 102 connected together by a bridge 104 and two temples 106, one connected to each lens. Each of the temples 106 includes a positioning member 108, a portion of which is shown in FIG. 2, for contacting a side of a user's head and/or ear for positioning the rimless eyewear on the user's head. Each temple 106 further includes a connection member 110 for connecting the temple 106 to the lens 102.

The connection member 110 is coupled to the positioning member 108 with a hinge 12. The connection member includes an orienting pin 114 used in achieving and maintaining proper position of the lens 102 relative to the temple 106 as further explained below. The connection member 110 also includes a threaded pin 116 to receive an interiorly threaded tapered cap 118 having a driver slot 119, and an expandable sleeve 120. The expandable sleeve 120 has a slit area 120' absent sleeve material extending the length of the expandable sleeve. The expandable sleeve 120 is placed onto the threaded pin 116 and has an interior diameter sufficient to allow the tapered cap 118 to be positioned on the threaded pin inward of the expandable sleeve. In other implementations the tapered cap 118 is open at both ends, and forms a tapered nut.

In the depicted implementation, the slit area 120' of the expandable sleeve 120 allows for radially outward expansion of the expandable sleeve under the urging of the tapered cap 118 as it is threaded onto the threaded pin 116. Other geometries and configurations to allow for expansion of the expandable sleeve 120 can be used with other implementations.

Figure 3:
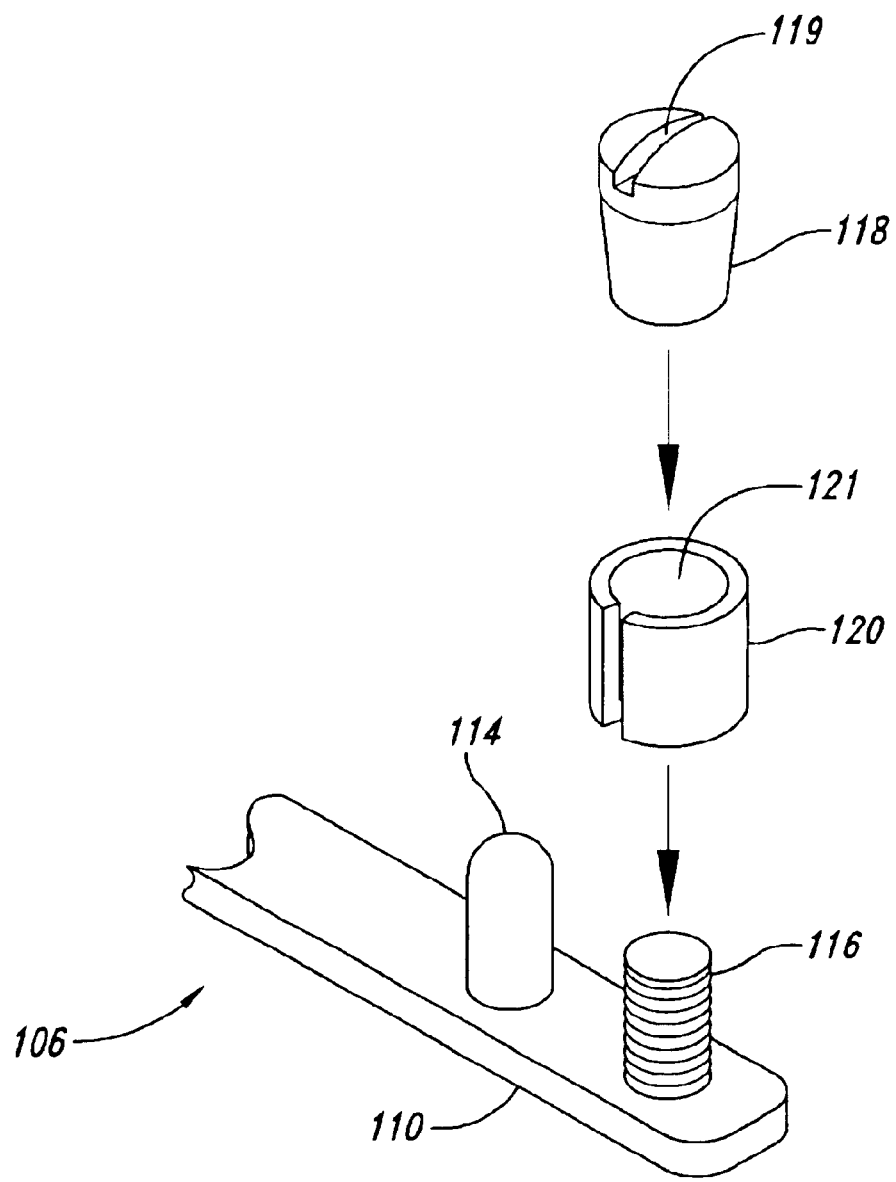
FIG. 3 is an enlarged isometric view of the temple portion shown in FIG. 2.
Figure 4:
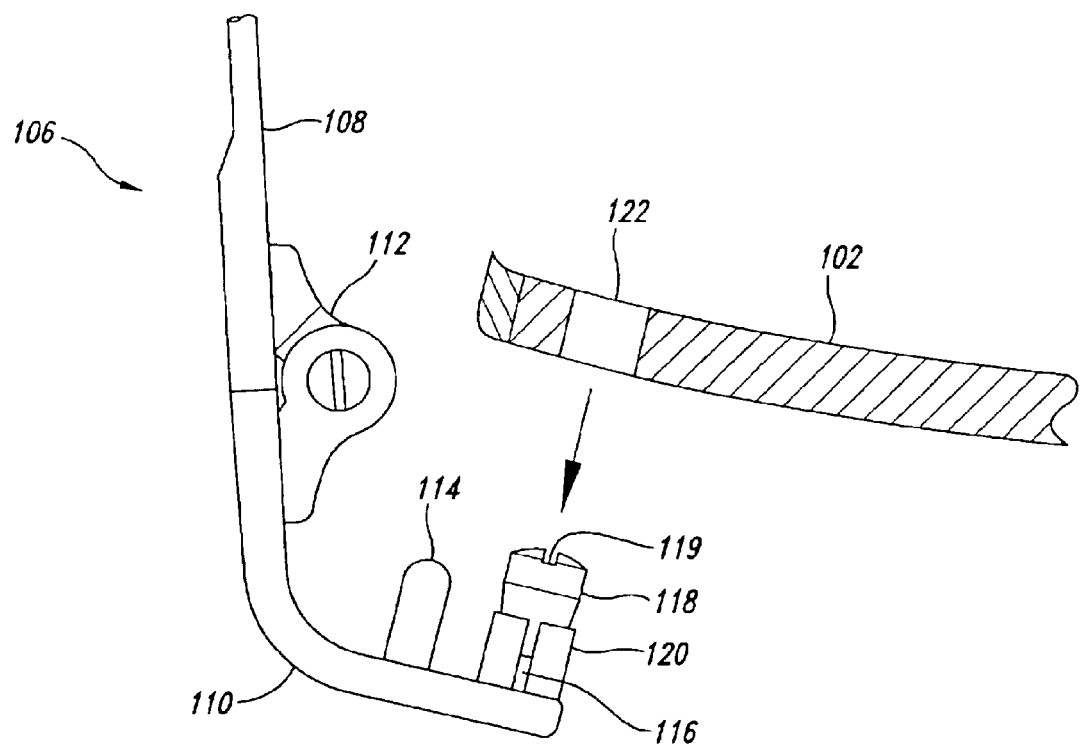
FIG. 4 shows the temple portion of FIG. 2 with a tapered cap secured onto a treaded pin and a lens positioned to be secured to the temple.
Figure 5:
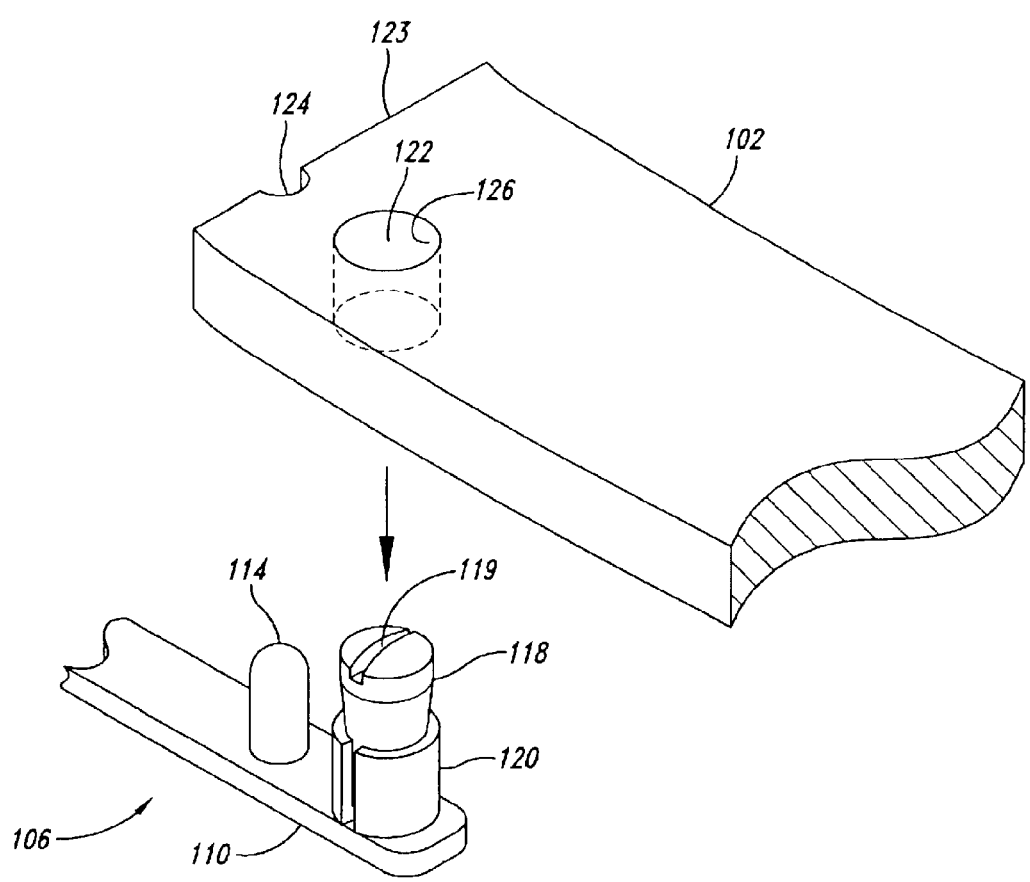
FIG. 5 is an enlarged isometric view of the temple portion and lens shown in FIG. 4.
Figure 6:
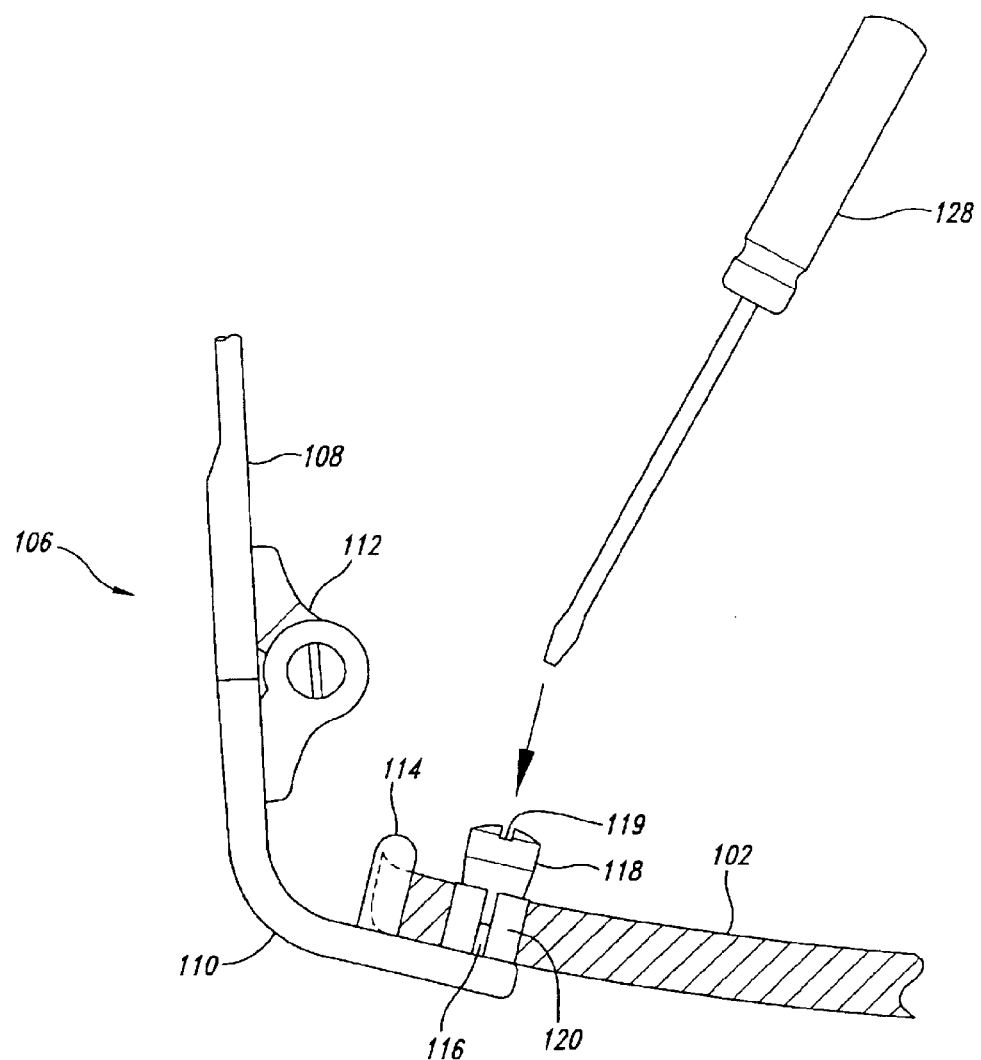
FIG. 6 shows the temple portion of FIG. 2 with the lens placed over the tapered cap and a positioning peg prior to final tightening of the tapered cap.

During assembly of the rimless eyewear 100, the expandable sleeve 120 is first placed over the threaded pin 116. The tapered cap 118 is then inserted into a first opening 121 of the expandable sleeve 120, shown in FIG. 3, having an inner diameter sized to allow for initial threading of the tapered caps onto the threaded pin 116 with significant expansion of the expandable sleeve, as shown in FIGS. 4–6. The portion of the lens 102 to which the connection member 110 of the temple 106 is to be attached as an attachment hole 122. Once the tapered cap 118 has been initially inserted into the expandable sleeve 120 and threaded onto the threaded pin 116, the attachment hole 122 of the lens 102 is brought into an aligning position over the tapered cap and the expandable sleeve as shown in FIG. 4. The lens 102 further has a circumferential surface 123 with an orienting notch 124. The lens 102 is brought into an aligning position with notch 124 over the orienting pin 114. Also shown in FIG. 5 is a surface wall 106 of the attachment hole 122, which will be further discussed below is relation to securing the lens 102 to the temple 106.

Figure 7:
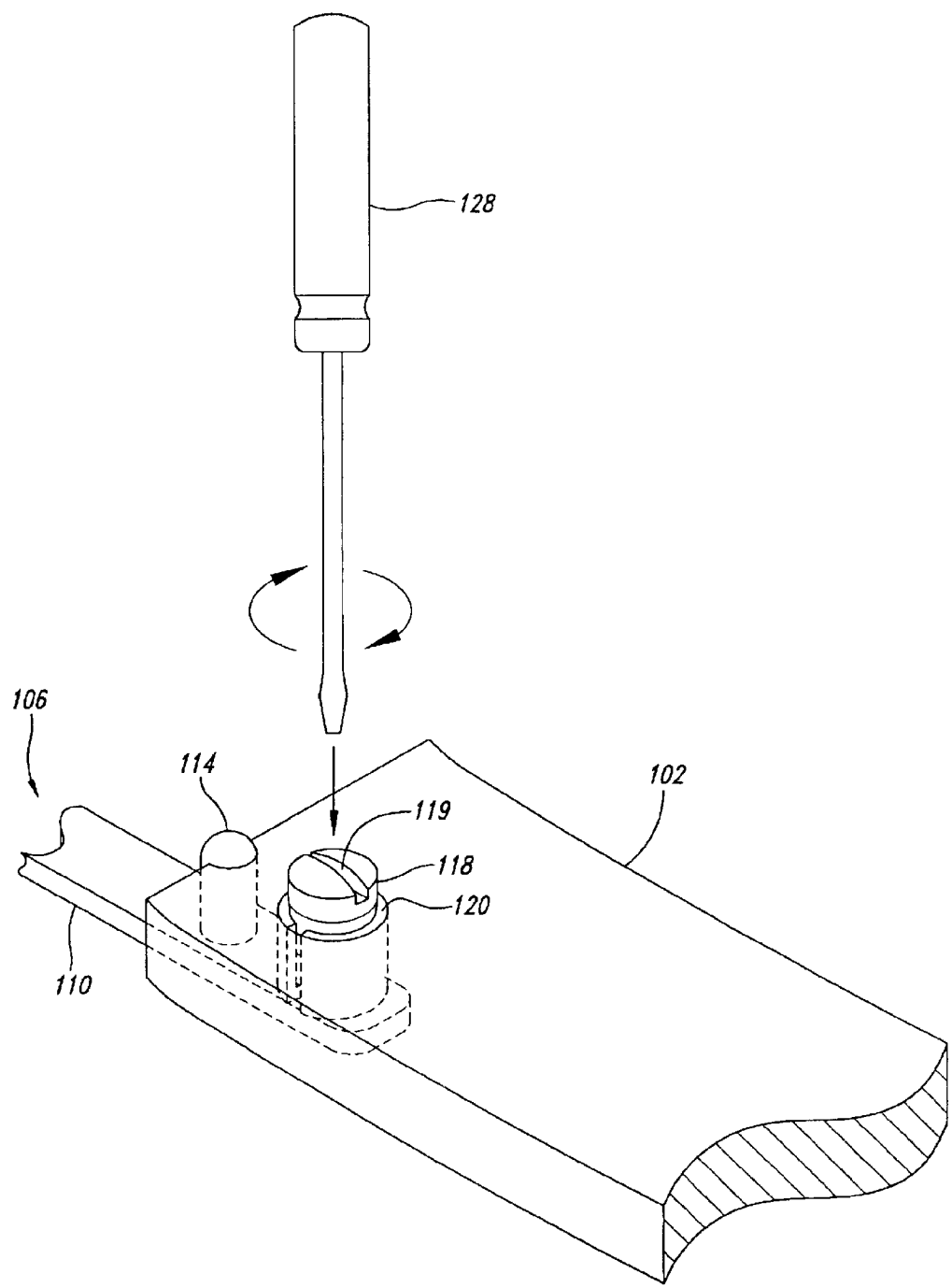
FIG. 7 is an enlarged isometric view of the temple portion and lens shown in FIG. 6.

The lens 102 and the connection member 110 of the temple 106 are then moved together with the orienting pin 114 being fitted within the orienting notch 124 and the tapered cap 118 extending through the attachment hole 122 with the expandable sleeve 120 residing in the attachment hole, as shown in FIG. 6. A screwdriver 128 is then brought into aligned contact with the driver slot 119 of the tapered cap 118 to tighten the tapered cap onto the threaded pin 116 as shown in FIG. 7.

Figure 8:
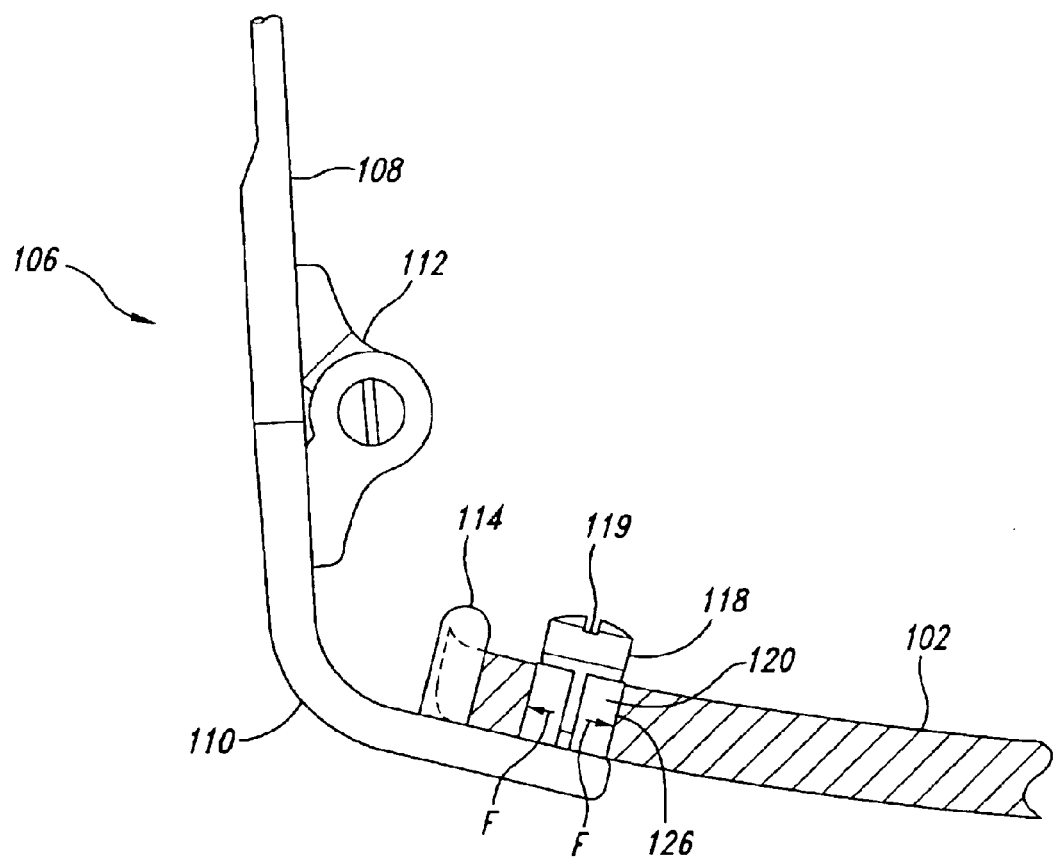
FIG. 8 shows the temple portion and lens of FIG. 6 with the tapered cap tightened to secure the lens to the temple portion.
Figure 9:
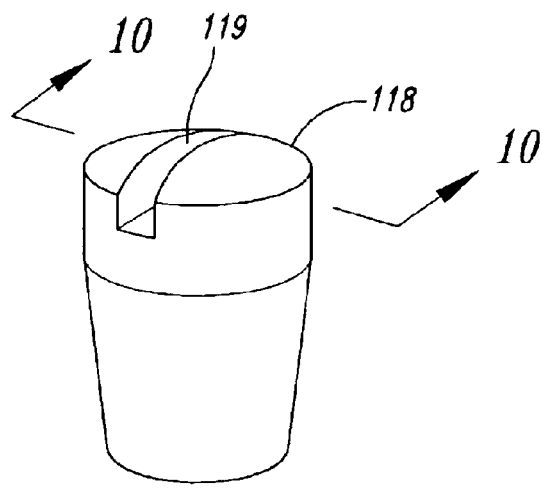
FIG. 9 is an enlarged isometric view of the tapered cap show in FIG. 2.

As the tapered cap 118 is tightened on the threaded pin 116 it forcibly contacts the interior wall of the expandable sleeve 120 causing the expandable sleeve to progressively expand radially outward. The expandable sleeve 120 consequently forcibly contacts the surface wall 126 of the attachment hole 122 of the lens 102 with a force F (shown in FIG. 8) to frictionally engage the expandable sleeve with the lens 102 thereby fixedly securing the connection member 110 of the temple 106 to the lens.

Figure 10:
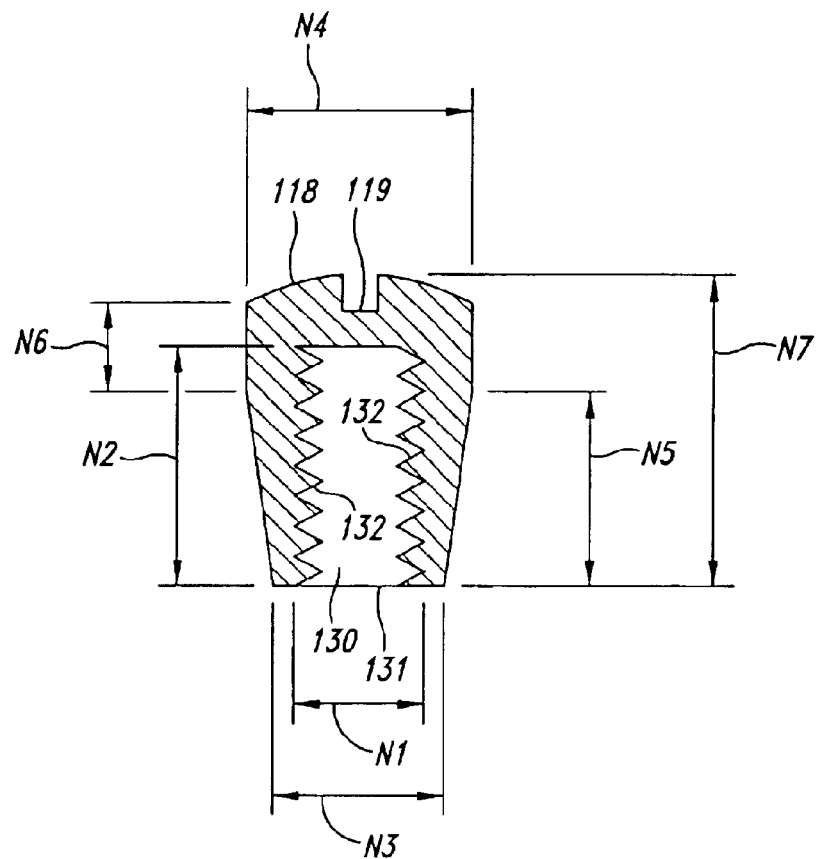
FIG. 10 is a cross-sectional view of the tapered cap taken along the line 10—1 of FIG. 9.

A cross-sectional view of the tapered cap 118 of the depicted implementation is illustrated in FIG. 10 and reveals an elongated threaded interior 130 having an open end 131 to receive the threaded pin 116. The threaded interior 130 has an inner diameter N1, a longitudinal length of N2 and threads 132 with pitch and thread count to match the pitch and thread count of the threaded pin 116 for threadable engagement of the threaded pin with the tapered cap 118.

Furthermore, the tapered cap 118 has an outer diameter of N3 toward the open end 131 that gradually increases to outer diameter N4 at a longitudinal distance of N5 from the open end. The tapered cap 118 has an longitudinal length of N6 over which the outer diameter remains at the outer diameter N4 resulting in a total longitudinal length for the tapered cap of N7. Although the depicted implementation of the tapered cap 118 has been described to have specific geometries, other geometries are used with other implementations such as being adapted to be tightened onto the threaded pin 116 by hex or allen wrenches or with other ratios of tapered to straight portions and other gradations of taper. Other objects having other geometries and incorporating a tapered cylinder portion as taught by the depicted implementation of the tapered cap 118 are found in other implementations.

Figure 11:
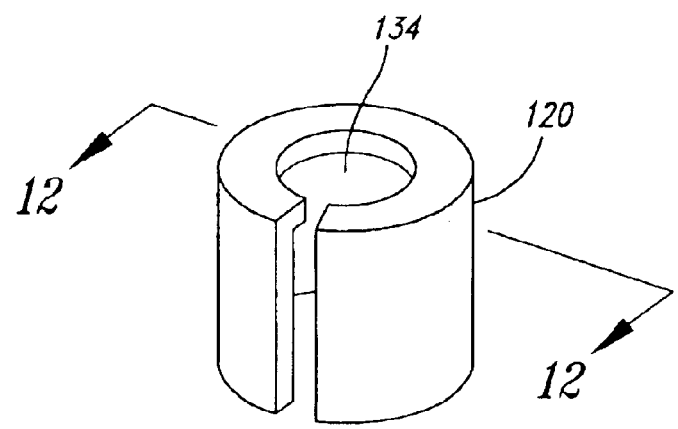
FIG. 11 is an enlarged isometric view of an expandable sleeve shown in FIG. 2.
Figure 12:
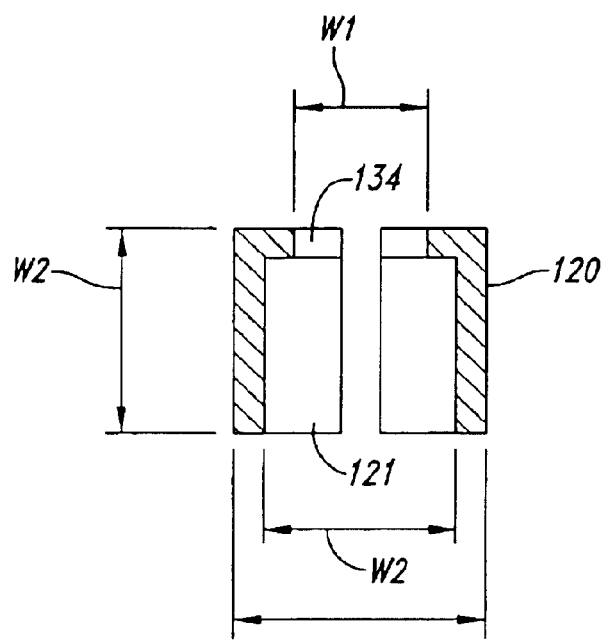
FIG. 12 is a cross-sectional view of the expandable sleeve taken along the line 12—12 of FIG. 11.

The expandable sleeve 120 has a second opening 134, shown in FIGS. 11 and 12 at an end thereof opposite the first opening 121, and with an inner diameter W1 sized to fit over the threaded pin 116 and smaller than the first opening. A cross-sectional view of the expandable sleeve 120 is shown in FIG. 12 and illustrates that the first opening 121 has an inner diameter of W2 being greater than the outer diameter N3 of the tapered cap 118 that allows the expandable sleeve to receive the tapered cap 118 through the second opening as previously discussed. The inner diameter W2 of the first opening 121 is smaller than the outer diameter N4 of the tapered cap 118.

Figure 13:
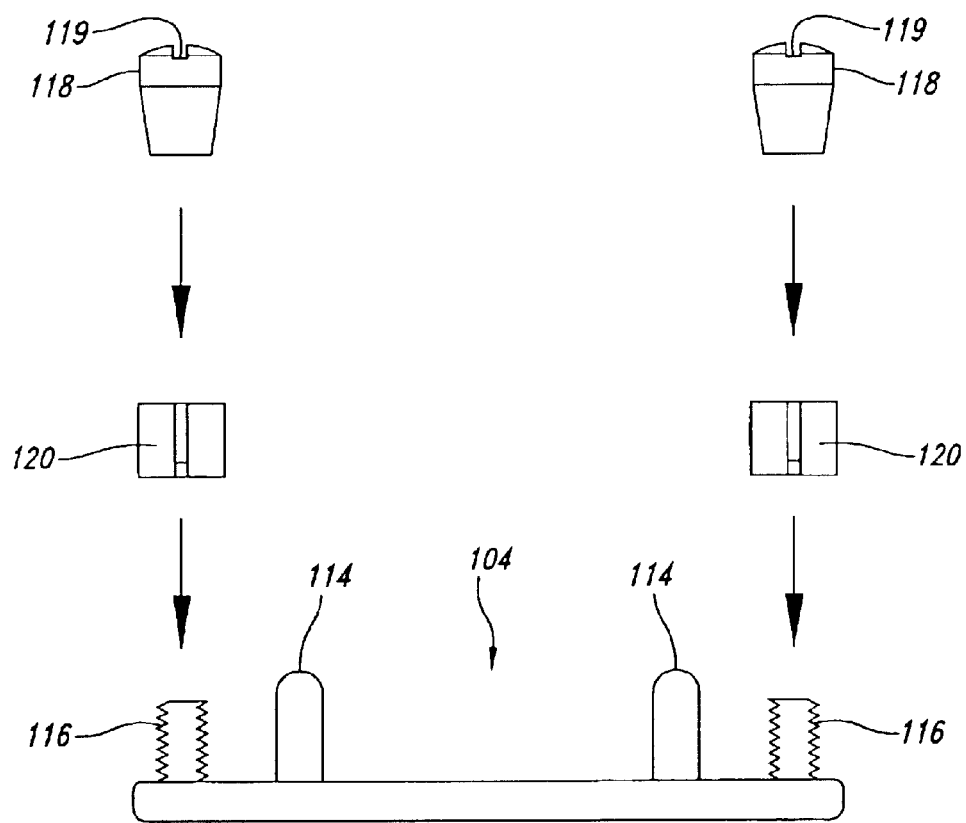
FIG. 13 is an exploded, enlarged top plan view of the bridge of the implementation shown in FIG. 1.
Figure 14:
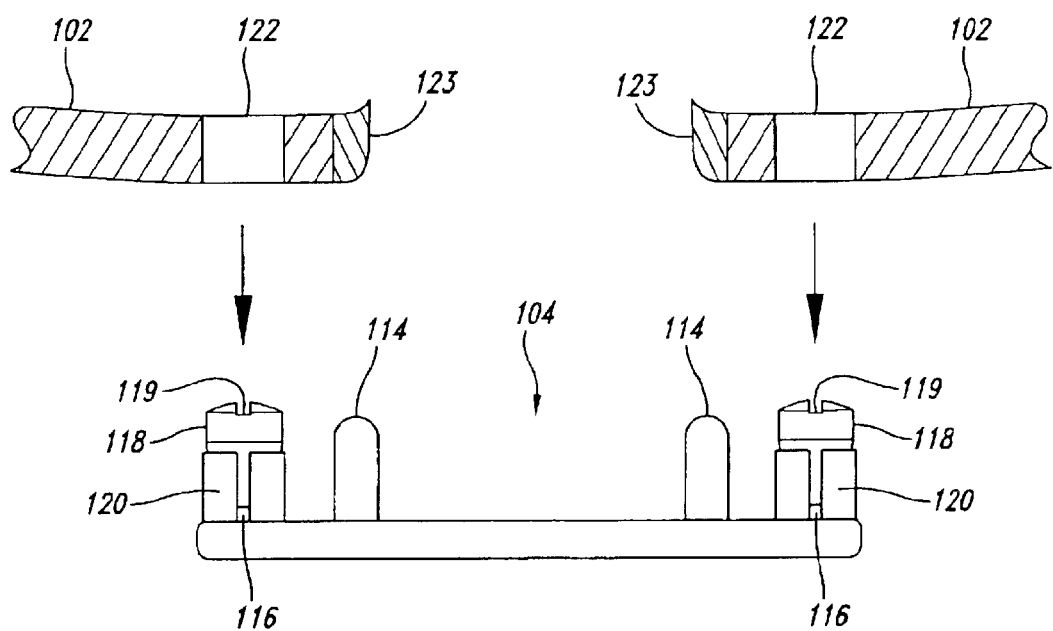
FIG. 14 shows the bridge of FIG. 13 with tapered caps secured onto thread pins and lenses positioned to be secured by the bridge.
Figure 15:
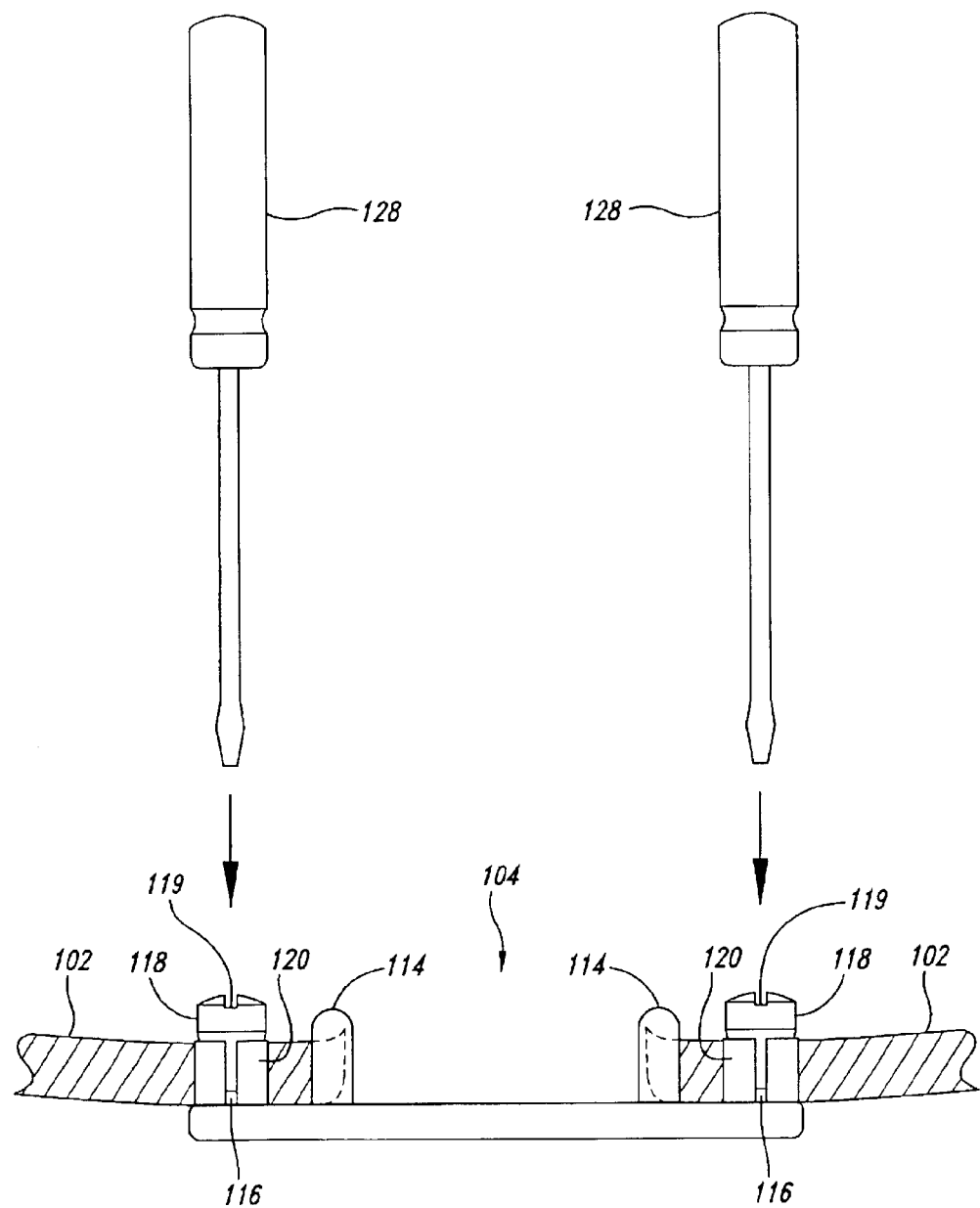
FIG. 15 shows the bridge of FIG. 14 with the lenses placed over the tapered caps and positioning pegs prior to final tightening of the tapered caps.
Figure 16:
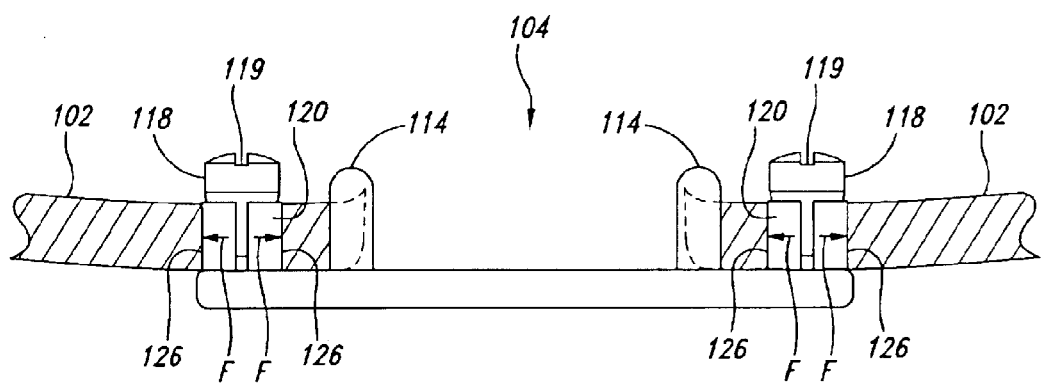
FIG. 16 shows the bridge and lenses of FIG. 15 with the tapered caps tightened to secure the lenses to the bridge.

As shown in FIG. 13, the bridge 104 includes two sets of the orienting pin 114, the threaded pin 116, the tapered cap 118, and the expandable sleeve 120 to connect the bridge 104 to each of the two lenses 102 generally in the same manner as described above for connection of the connection member 110 of the temple 106 to the lens. To connect the bridge 104 to the lenses 102, one expandable sleeve 120 is first positioned on each of the two treaded pins 116 of the bridge as shown in FIG. 14. One tapered cap 118 is subsequently threaded onto each of the threaded pins 116. An additional attachment hole 122 is provided in the portion of each lens 102 to which the bridge 104 is to be attached. The lenses 102 and the bridge 104 are placed in aligning positions and then moved together with the tapered caps 118 extending through the attachment hole 122 and the orienting pins 114 in second orienting notches 123 of the lens, as shown in FIGS. 14 and 15. The tapered caps 118 are subsequently tightened with the screwdriver 128 shown in FIG. 15 with the tapered caps thereby causing the expandable sleeves 120 to expand radially outward. This results in the radial force F shown in FIG. 16 on the surface walls 126 of the attachment holes 122, thereby frictionally engaging the expandable sleeves 120 with the lenses 102 to secure the bridge 104 to the lenses.

From the foregoing it will be appreciated that, although specific embodiments of the invention have been described herein for purposes of illustration, various modifications may be made without deviating from the spirit and scope of the invention. For instance, the expandable sleeve in the depicted implementation is rigid with a longitudinal slit, however, in other implementations, the expandable sleeve could be made of an elastic or other deformable material not requiring a slit for expansion. As another example, the tapered cap 118 is threadably attached in the depicted implementation, however, other implementations can use other means of attachment of tapered objects to expand sleeves or tubes to frictionally engage with the lenses 102. Accordingly, the invention is not limited except as by the appended claims.

I claim:

1. Eyewear comprising:
   a first lens and a second lens, each lens having a hole with a hole diameter and an inner surface, each lens having a circumferential surface; and
   a first temple connected to the first lens and a second temple connected to the second lens, each temple including a positioning member, a connection member, and a hinge, the positioning member coupled to the connection member by the hinge, the connection member of each temple including:
      a threaded pin with a pin diameter and threads, the threaded pin extending into the lens hole of the one of the first and second lenses to which the temple is connected;
      an expandable sleeve being a longitudinal hollow cylinder having an inner sleeve diameter, an outer sleeve diameter, an outer sleeve surface and first and second ends, the first end having an opening with an inner diameter greater than the pin diameter, the second end having an opening with a second inner diameter, the threaded pin extending through the first end opening and within the expandable sleeve; and
      a tapered cap having an interior, a first end portion with an opening providing access to the interior, the interior having a threaded inner surface, the threaded pin extending into the interior of the tapered cap through the opening of the tapered cap, the tapered cap being threaded onto the threaded pin, the first end portion having a first exterior surface portion with a first outer diameter smaller than the second inner diameter of the expandable sleeve, the tapered cap having a second portion having a second exterior surface portion with a second outer diameter greater than the first outer diameter, the tapered cap extending at least partially within the expandable sleeve, the tapered cap having an exterior surface extending between the first and second exterior surface portions with an outer diameter increasing from the first outer diameter of the first end portion to the second outer diameter of the second portion to increasingly frictionally engage the tapered cap with the expandable sleeve and radially outward expand the outer sleeve diameter of the expandable sleeve as the tapered cap is being threaded onto the threaded pin, the second outer diameter of the tapered cap being sized to radially expand the expandable sleeve to increase the outer sleeve diameter sufficiently to frictionally engage the outer sleeve surface with the inner surface of the lens hole within which positioned to securely connect the connection member with the one of the first and second lenses to which the temple is connected.

2. The eyewear of claim 1 wherein the expandable sleeve is made from a rigid material and includes a slit extending along the longitudinal length of the expandable sleeve.

3. The eyewear of claim 1 wherein the expandable sleeve is made from an expandable material.

4. The eyewear of claim 1 wherein the connection member includes an orienting pin in contact with the circumferential surface of the one of the first and second lenses to which the temple is connected.

5. The eyewear of claim 2 wherein the circumferential surfaces of the first and second lenses each have a notch, and the orienting pin contacts the notch of one of the first and second lenses to which the temple is connected.

6. Eyewear comprising:
   a first lens and a second lens, each lens having a hole with a hole diameter and an inner surface, each lens having a circumferential surface; and
   a bridge having a first bridge portion connected to the first lens and a second bridge portion connected to the second lens, each bridge portion including:
      a threaded pin with a pin diameter and threads, the threaded pin extending into the lens hole of the one of the first and second lenses to which the bridge portion is connected;
      an expandable sleeve being a longitudinal hollow cylinder having an inner sleeve diameter, an outer sleeve diameter, an outer sleeve surface and first and second ends, the first end having an opening with an inner diameter greater than the pin diameter, the second end having an opening with a second inner diameter, the threaded pin extending through the first end opening and within the expandable sleeve; and
      a tapered cap having an interior, a first end portion with an opening providing access to the interior, a threaded inner surface, the threaded pin extending into the interior of the tapered cap through the opening of the tapered cap, the tapered cap being threaded onto the threaded pin, the first end portion having a first exterior surface portion with a first outer diameter smaller than the second inner diameter of the expandable sleeve, the tapered cap having a second portion having a second exterior surface portion with a second outer diameter greater than the first outer diameter, the tapered cap extending at least partially within the expandable sleeve, the tapered cap having an exterior surface extending between the first and second exterior surface portions with an outer diameter increasing from the first outer diameter of the first end portion to the second outer diameter of the second portion to increasingly frictionally engage the tapered cap with the expandable sleeve and radially outward expand the outer sleeve diameter of the expandable sleeve as the tapered cap is being threaded onto the threaded pin, the second outer diameter of the tapered cap being sized to radially expand the expandable sleeve to increase the outer sleeve diameter sufficiently to frictionally engage the outer sleeve surface with the inner surface of the lens hole within which positioned to securely connect the bridge portion with the one of the first and second lenses to which the bridge portion is connected; and an orienting pin in contact with the circumferential surface of the one of the first and second lenses to which the bridge portion is connected.

7. For connecting a frame member with an eyewear lens, the eyewear lens having a hole with a hole diameter and an inner surface, a system comprising:

a threaded pin with a pin diameter and exterior threads sized to extend into the lens holed;

a tubular member with an interior having an inner surface portion with an inner diameter, the tubular member having a first outer diameter smaller than the lens hole diameter without an outward force applied to the inner surface portion and a second outer diameter substantially equal to the hole diameter to engage the lens hole inner surface when the outward force is applied to the inner surface portion; and an attachment member having a first exterior portion, a second exterior portion and an interior portion with a threaded inner surface having interior threads matching the exterior threads of the threaded pin, the first portion having a first outer diameter smaller than the inner diameter of the tubular member and, the second exterior portion having a second outer diameter larger than the first outer diameter, the second outer diameter of the second exterior portion sized to apply at least the outward force to the inner surface portion of the tubular member with the first exterior portion being within the interior of the tubular member when the second exterior portion is advanced at least partially into the interior of the tubular member.

8. The system of claim 7 wherein the threaded pin is affixed to one of the following as a frame member: a temple and a bridge.

9. The system of claim 7 wherein the tubular member has a slit extending along its length.

10. The system of claim 7 wherein the tubular member is made from an expandable material.

11. The system of claim 7 wherein the attachment member is a tapered cap.

12. The system of claim 7 wherein the attachment member is a tapered nut.

13. Eyewear comprising:

two lenses, each with a plurality of holes;

a plurality of threaded pins;

two temples, at least one of the plurality of threaded pins being affixed to each of the two temples;

a bridge having two portions, at least one of the plurality of threaded pins being affixed to each of the two portions;

a plurality of expandable sleeves, each being positioned in one of the lens holes; and a plurality of tapered cylinder members being positioned in one of the sleeves, each of the threaded pins being threadably engaged with one of the plurality of tapered cylinder members to expand outward one of the sleeves to engage the lens having the lens hole in which positioned.

14. The eyewear of claim 13 further including a plurality of orienting pins, one of the orienting pins being affixed to each of the two portions of the bridge and each of the two temples, each of the orienting pins being in contact with an edge of one of the lens.

15. The eyewear of claim 14 wherein each lens includes a plurality of notches, and each of the orienting pins contacts one of the notches of the lens edge contacted.

16. A method of assembling eyewear comprising:

positioning an expandable sleeve adjacent to a threaded pin affixed to an eyewear frame member;

positioning a tapered cylinder within the sleeve and threadably coupling the tapered cylinder to the threaded pin of the frame member for movement toward the frame member;

positioning a lens with the sleeve and the tapered cylinder within a hole of the lens; and screwing the tapered cylinder further on the threaded pin to move the tapered cylinder toward the frame member to expand the sleeve within the lens hole to frictionally couple the sleeve to the lens.

17. A method of assembling eyewear comprising:

positioning an expandable sleeve with respect to a threaded pin affixed to the frame member;

positioning a tapered cylinder to threadably engage the threaded pin a first distance into the expandable sleeve;

positioning the expandable sleeve and tapered cylinder into a hole in a lens; and screwing the tapered cylinder further onto the threaded pin a second distance into the sleeve greater than the first distance to expand the sleeve to frictionally couple the sleeve to the lens.

18. A method of assembling eyewear comprising:

inserting a tapered member a first distance into a sleeve;

threadably coupling the tapered member while in the sleeve to a threaded pin affixed to a frame member;

positioning the sleeve and tapered member within a hole in a lens; and screwing the tapered member further onto the threaded pin to a second distance into the sleeve greater than the first distance to expand the sleeve to frictionally couple the sleeve to the lens.

* * * * *